DE WITT H. LEAS & J. P. FERGUSON.
HEATING DEVICE.
APPLICATION FILED FEB. 1, 1911.

1,085,273.

Patented Jan. 27, 1914.

UNITED STATES PATENT OFFICE.

DE WITT H. LEAS AND JAMES P. FERGUSON, OF DELAWARE, OHIO.

HEATING DEVICE.

1,085,273. Specification of Letters Patent. Patented Jan. 27, 1914.

Application filed February 1, 1911. Serial No. 605,904.

*To all whom it may concern:*

Be it known that we, De Witt H. Leas and James P. Ferguson, citizens of the United States, residing at Delaware, in the county of Delaware and State of Ohio, have invented certain new and useful Improvements in Heating Devices, of which the following is a specification.

The present invention relates to certain novel and useful improvements in heating devices and has particular application to devices of the class referred to, adapted especially for use in connection with incubators and brooders.

In carrying out the invention, it is our purpose to provide a heating device, suitably arranged relative to the incubator proper, whereby the heating agent, such as a hot water stove, will have the heat regulated and supplied thereto automatically.

Still a further object of the invention is to provide a simple, compact heater controlled through the medium of a thermostat.

Another object of the invention is to provide a device of the character described, embracing the desired features of simplicity, durability and cheapness.

With the above recited objects and others of a similar nature in view, the invention consists in the construction, combination and arrangement of parts set forth in and falling within the scope of the appended claims.

Figure 1:
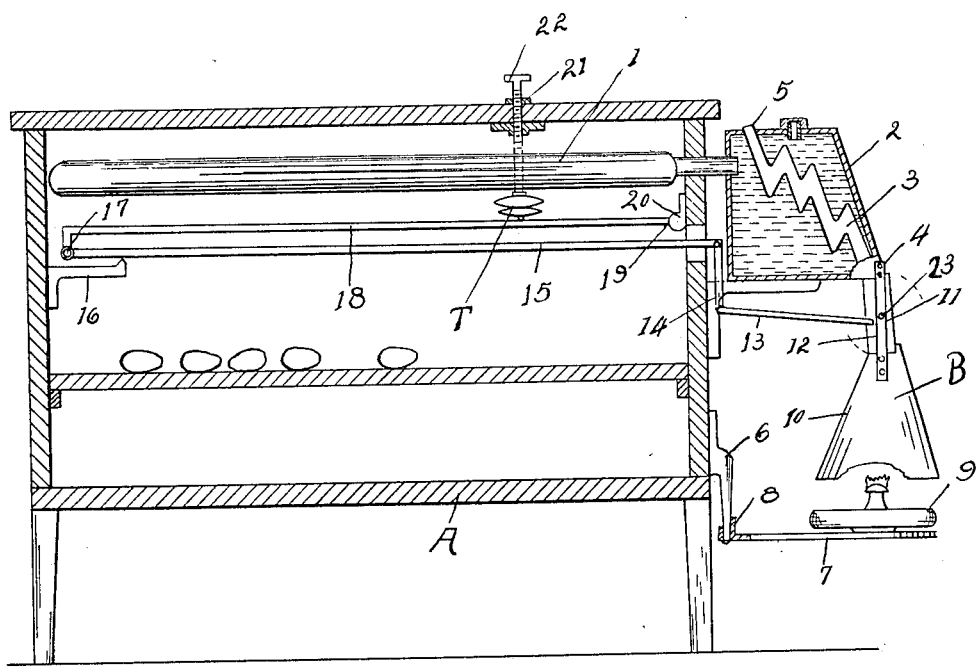
Figure 2:
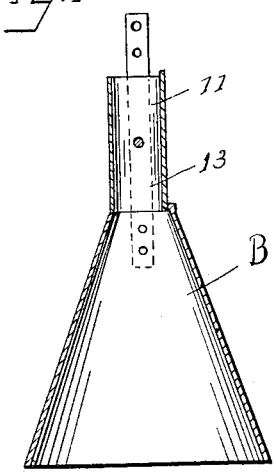

In the accompanying drawings—Figure 1 is a side view partly in section and partly in elevation of an incubator and heater, embodying the invention, and, Fig. 2 is a vertical sectional view, taken through the body portion of the heat conducting portion of the stove.

As is well known in incubators, it is desirable to maintain a certain degree of temperature and to do this, it is necessary that the stove or other heating device be automatically regulated.

Referring now to the accompanying drawings in detail, the letter A designates the incubator cabinet, which may be of any suitable and well known construction and is provided with a heating water-coil 1 communicating with the water chamber or casing 2. The water casing as is shown in Fig. 1, is provided with a staggered heating tube 3 extending from the base of the chamber as at 4, to and through the top thereof as at 5. This tube is preferably staggered as shown, in order that the passage of the heated air through the same may be prolonged and the water thereby properly heated. Suitably arranged outside of the incubator cabinet and beneath the casing, is a bracket arm 6 having a lamp bracket 7 pivoted or swiveled thereto as at 8.

The numeral 9 designates a lamp of any suitable construction, which is carried by the bracket and said lamp is arranged beneath the heat conductor which is indicated as an entirety by the letter B. This conductor which is formed of any suitable material such as sheet metal, galvanized iron or the like, comprises the lower flaring or conical section 10 extending directly over the lamp, and the tubular section 11. Near the top of the flared section, we provide suitable vertical supports 12, connected at their upper ends to the casing forming the chamber 4 and to which the tubular section 11 is pivoted as at 23, the construction and arrangement being such that the tubular or cylindrical section may be tilted or swung upon its pivot to direct the current of heated air into the staggered conductor when the tube is in alinement therewith. It is also to be noted that when such tube is swung out of alinement, the cold air may enter the staggered conductor and thereby tend to reduce the temperature of the water.

The numeral 13 designates a horizontally extending rod connected to the pivoted tubular section 11, said rod being connected through the link 14 with the rod 15, which extends across the interior of the incubator or cabinet and is fulcrumed on the support 16.

At 17 the rod 15 is pivotally connected to the parallel rod 18, the latter in turn being pivoted as at 19 to the lug or eye 20. Connected to said rod 18 is the thermostat T of any form or character, which may be adjusted as desired through the medium of the adjusting screw 21, which extends through the cabinet top and is provided with the head 22.

From the above description, taken in connection with the accompanying drawings, the construction and operation of the invention will be readily apparent.

In the operation, the lamp or other heating agent is lighted and the bracket swung until it is directly beneath the flaring or conical section 10. The thermostat being in its contracted or non-expanded condition, the pivoted tubular member 11 will be moved until it is in alinement with the staggered conductor within the water casing, so that the heat is directed to the water casing or chamber. When a sufficient degree of heat has been reached within the cabinet or incubator and the thermostat has expanded under the influence of the same, the rods 18 and 15, the latter as above described being fulcrumed at 16, tend to operate through the link 14 and actuate the arm 13 so that the tubular member 11 is swung upon its pivot out of alinement with the staggered heat conductor, the heat then passing to the open air while the cold air may enter the conductor and tend to reduce the temperature within the water chamber. As the thermostat cools and contracts, the arrangement of links and lever rods draws the tubular member 11 back into its normal position in alinement with the staggered conductor and again directs the heat to the water chamber. Thus it will be seen that we have provided a means for controlling the degree of admitted heat without altering the position of the flared hood, which practical experience demonstrates is of great importance.

It will be noted that we have provided an exceedingly simple and convenient arrangement whereby through the connections described, the desired temperature is always retained within the incubator and this without requiring any personal attention. It will further be seen that the staggered conductor will receive both the heated air and cold air, so that the required temperature is always maintained.

What we claim, is—

1. The combination of an incubator, a water circulating system within said incubator, a casing without said incubator forming a water reservoir, and having a passage through said casing, brackets depending from said casing, a flared hood immovably supported from the lower extremities of said brackets, a lamp disposed beneath said hood, an intermediate tube pivotally supported between said brackets and normally forming a heat passage from the hood to the said passage and adapted when swung upon its pivot to divert varying quantities of the heating medium away from the said first passage, a thermostat within said incubator, levers connected to said thermostat and to said intermediate tube for swinging said tube on its pivot, and a regulating device for said thermostat.

2. The combination of an incubator, a water circulating system within said incubator, a casing without said incubator forming a water reservoir, and having a zig-zag passage through said casing, brackets depending from said casing, a flared hood immovably supported from the lower extremities of said brackets, a lamp disposed beneath said hood, an intermediate tube pivotally supported between said brackets and forming a heat passage from the hood to the said zig-zag passage and adapted when swung upon its pivot to divert varying quantities of the heating medium away from the said zig-zag passage, a thermostat within said incubator, levers connected to said thermostat and to said intermediate tube for swinging said tube on its pivot, and a regulating device for said thermostat.

In testimony whereof we affix our signatures in presence of two witnesses.

DE WITT H. LEAS.
JAMES P. FERGUSON.

Witnesses:
A. LINN,
ARTHUR J. WHITE.

---

Copies of this patent may be obtained for five cents each, by addressing the "Commissioner of Patents, Washington, D. C."